United States Patent Office 3,072,705
Patented Jan. 8, 1963

3,072,705
PROCESS FOR REACTING NITROSYL HALIDE WITH FLUORINE-CONTAINING OLEFINS AND PRODUCTS PRODUCED THEREFROM
Joseph D. Park, Boulder, Colo., and Andrew P. Stefani, Syracuse, N.Y., assignors to Minnesota Mining and Manufacturing Company, St. Paul, Minn., a corporation of Delaware
No Drawing. Filed Oct. 20, 1960, Ser. No. 63,715
18 Claims. (Cl. 260—466)

This invention relates to new and useful nitrogen-containing compounds and their derivatives. In one aspect this invention relates to a method for preparing halogen and nitrogen-containing compounds useful for producing other compounds, such as thermoplastic and elastomeric polymers. In still another aspect, this invention relates to a method for making useful fluorine-containing liquids, thermoplastics and elastomers.

There are many halogen, oxygen and nitrogen-containing carbon compounds in the art. However, few, if any, carbon compounds have combined these elements into a single compound. A combination of halogen, oxygen and nitrogen in a single compound is a desirable goal since these elements contribute certain specific chemical and physical properties to the ultimate compound, as a result of which combined physical properties the new compounds resulting therefrom have many useful properties and uses. Accordingly, it is the purpose of this invention to provide a new method for making such compounds containing nitrogen, oxygen and halogen and to produce therefrom new and useful derivatives having properties not heretofore found in other compounds of the art.

The object of this invention is to provide new and useful halogen, oxygen and nitrogen-containing compounds.

Another object of this invention is to provide a process for the preparation of halogen, oxygen and nitrogen-containing compounds.

Another object of this invention is to provide a new process, which is more economical and capable of higher yields, for making nitroso organic compounds.

Still another object of this invention is to provide new monomers for use in making thermoplastic and elastomeric compositions.

Yet another object is to provide a continuous process for making halogenated organic compounds containing an oxide of nitrogen.

Various other objects and advantages of the present invention will become apparent to those skilled in the art from the accompanying description and disclosure.

According to this invention, halogenated organic compounds containing an oxide of nitrogen are produced by reaction of nitrosyl halide, such as the bromide, fluoride or chloride, with a halogen-containing olefin in which the doubly bonded carbon atoms are completely substituted, such as with any of the halogens, chlorine, bromide, fluorine and iodine, or an alkyl radical, such as methyl, ethyl, etc. The adduct thus obtained contains a carbon chain of at least two carbon atoms having an oxide of nitrogen group attached to one and a halogen, such as chlorine, attached to the other of two adjacent carbon atoms in said chain in which said oxide of nitrogen group is either a nitro or nitroso group, preferably a nitroso group. Preferably, the olefin has at least one fluorine atom attached to at least one of the carbon atoms of the double bond and thereby produces an adduct which also contains at least one fluorine atom on at least one of said two adjacent carbon atoms. The reaction between the nitrosyl halide and the olefin is carried out in either the liquid or vapor phase under appropriate conditions of reaction. The temperature of reaction is usually between about 20° C. and about 150° C. Preferably, the reaction is carried out at about 35 to 75° C. either in the presence or absence of a catalyst, such as activated charcoal. Under such conditions, the reaction is carried out generally in the vapor phase but sufficient pressure may be utilized to cause either or both of the reactants to be present in the reaction zone in the liquid phase without departing from the scope of this invention. The addition reaction can be carried out in a batch-type or continuous operation. In a batch-type operation the reaction time is usually between about 15 and about 50 hours. In a continuous operation, the reactants are continuously charged to the reaction zone, such as a tubular reactor, and the product continuously removed therefrom, with a residence time of about 10 seconds to 30 minutes or longer.

In one embodiment of this invention, the nitrosyl halide is formed in situ during the reaction under the above conditions and manner of operation. Thus, nitric oxide and the terminally unsaturated olefin are introduced into the reaction zone into contact with a heavy metal halide in which the heavy metal is a variable valence metal having an atomic number of at least 26 and preferably not more than 29, such as ferric chloride, cuprous chloride and cobaltous chloride. Nitrosyl halide, such as nitrosyl chloride, is formed in situ and is then reacted with the olefin to produce the adduct. The formation of nitrosyl halide in situ is unique in the present system because the interaction of nitric oxide with the metal halide will not produce nitrosyl halide unless the olefin is present. This embodiment is particularly adaptable to a continuous system in which the metal halide is present in the reaction zone as a fluidized bed of finely divided powder. The metal halide may be continuously added and removed from the reaction zone by conventional standpipes.

The proportion of reactants is a mol ratio of olefin to nitrosyl halide of approximately 1:1 or higher to obtain the adduct. Preferably, an excess of olefin is used, such as a mol ratio of 1.5:1 or 2.5:1.

The major product of the reaction of this invention is the nitroso adduct, such as the nitroso chlorofluoroalkanes. In some instances, mixtures of the nitroso, nitro and nitrite compounds may be produced, which mixtures can be separated into their separate components by fractional distillation and other conventional methods. In producing the nitroso adduct, non-oxidizing conditions should be used; such as excluding substantially all free oxygen from the reaction zone, and the excess of nitrosyl halide maintained low to minimize or prevent the formation of the nitro and nitrite groups.

A typical structural formula for representing the preferred adducts produced by the process of this invention is

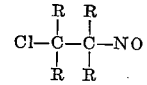

in which R is a substituted or non-substituted alkyl radical of not more than 8 carbon atoms or halogen and at least one R is fluorine. Preferably, the R is a halogen, such as fluorine, and/or a perhalogenated or partially halogenated alkyl radical of not more than 4 carbon atoms, and preferably the halogens are fluorine and/or chlorine.

The olefin employed in the reaction with the nitrosyl halide is preferably an acyclic monoolefin-1 or conjugated diolefin containing not more than 12 carbon atoms per molecule, generally not more than 6 carbon atoms, in which the doubly bonded carbon atoms are completely substituted with halogens or alkyl groups (R) as defined above. The preferred class of olefins is the perhalogenated monoolefins-1 in which the halogens are normally gaseous halogens and in which at least one fluorine atom is attached to each of the carbon atoms of the double bond. Examples of such preferred class of olefins are tetrafluoroethylene, trifluorochloroethylene, perfluoropropene and perfluoroisobutene. Those fluorine-containing olefins which are perhalogenated but contain only chlorine one one of the carbon atoms of the double bond are also useful as reactants with the nitrosyl halide in accordance with this invention. Such olefins include unsymmetrical difluorodichloroethylene, 2-chloropentafluoropropene-1, and 1,1-dichlorotetrafluoropropene-1. Other olefins which may be employed are those which are only partially halogenated. Examples of such olefins are 1-hydroperfluoropropene-2, 1-hydroperfluorobutene-2 or -3, 1,1-dihydroperfluoropropene-2, and 1,1-dihydroperfluorobutene-3. A suitable example of a diolefin reactant is perfluorobutadiene-1,3.

Where the olefin is readily polymerizable with the adduct and there is a tendency to polymerize therewith during the formation of the adduct, the use of stoichiometric quantities of reactants necessary to produce the adduct will minimize concurrent copolymerization. Also the use of low temperatures and mild initiators will also minimize the copolymerization reaction. In the batch-type operation, formation of copolymer during adduct formation may be prevented or minimized by removal of the adduct as formed, such as by condensation and separation thereof from the reaction zone. The use of a continuous reaction system followed by quenching of the product facilitates selectivity of the reaction toward adduct formation alone.

Some of the adducts produced by the process of the present invention are nitroso chloroperfluoroethane, nitroso trifluorodichloroethane, nitroso trichlorodifluoroethane, nitroso chloroperfluoropropane, nitro chloroperfluoroethane, and nitro chloroperfluoropropane.

In accordance with the present inevntion, the adducts above described can be isolated and separated from impurities, such as oxides of nitrogen (NO, $NO_2$, $N_2O_3$), which may function as chain transfer agents during subsequent polymerization, by fractional distillation. Thereafter, the isolated adduct may be copolymerized with unsaturated organic compounds to produce useful polymers which vary in physical form from normally liquid to normally solid high molecular weight material depending upon the polymerization conditions and reactants. The low molecular weight liquid and waxy polymers of this invention correspond to a degree of polymerization or telomerization of 2 to 100. The solid copolymers produced in accordance with the present invention have an average molecular weight above 50,000 and generally above 100,000 and as high as 150,000 and 200,000 and higher. The solid copolymer produced by the method of the present invention is either a thermoplastic or elastomeric material. The polymers produced from the nitroso adducts are of linear structure with a nitroso group in the polymer chain. Both the elastomeric and thermoplastic copolymers are usually insoluble in conventional hydrocarbon solvents but are soluble in fluorinated hydrocarbons.

The comonomers with which the adducts of the present invention are copolymerized are the polymerizable unsaturated organic compounds, preferably having ethylenic unsaturation and not more than about 10 carbon atoms per molecule. More preferably, these are acyclic olefins having at least 2 halogen atoms per molecule, at least 2 of which are fluorine. However, both unsubstituted and substituted unsaturated organic compounds may be employed as the comonomer without departing from the scope of this invention. Examples of substituted unsaturated organic compounds which are useful as the comonomer are the monoolefins containing at least one fluorine atom on at least one carbon atom of the double bond, such as vinylidene fluoride, trifluoroethylene, difluoromonochloroethylene, tetrafluoroethylene, trifluorochloroethylene, unsymmetrical difluorodichloroethylene, and perfluoropropene; the fluorine-containing diolefins, such as 1,1-difluorobutadiene-1,3, 1,1,3-trifluorobutadiene-1,3, 1,1-difluoro-2-methylbutadiene-1,3, 1,1-difluoro-3-methylbutadiene-1,3 and 1,1,2,4,4-pentafluorobutadiene; and fluorine-containing vinyl ethers, such as 2,2,2-trifluoroethylvinyl ether and methyltrifluorovinyl ether; and the fluorine-containing esters, such as the acrylate ester of 1,1-dihydroheptafluorobutanol and methacrylate ester of n-ethylperfluorooctane sulfonamido ethanol. Non-halogenated substituted comonomers which may be used are propyl vinyl ether, acrylonitrile and styrene. An example of a non-substituted olefinically unsaturated comonomer is butadiene-1,3.

Various polymerization techniques may be utilized to copolymerize the monomers of the present invention to produce the copolymer product. Accordingly, the polymerization may be carried out as a bulk polymerization in which the monomers are polymerized in a bomb under autogeneous pressure at temperatures below 10° C., preferably below 0° C. and as low as −65° C., for a period of time of at least one-half hour to obtain a high conversion to the solid polymer.

It has also been found that polymers can be produced by the use of the aqueous emulsion technique in which the monomers are emulsified in an aqueous medium during polymerization. This technique may be carried out at substantially higher temperatures than the bulk system, and temperatures above 0° C. and as high as 50° C. may be employed. The use of an emulsifier and higher temperatures increases the rate of reaction but does not result in lower molecular weight material. The perhalogenated alkanoic acids and salts thereof are particularly good emulsifying agents. A particularly suitable emulsifier is perfluorooctanoic acid or the potassium salt thereof.

If production of liquids and waxes is desired, higher temperatures up to about 150° C. and chain transfer agents, such as dodecyl mercaptan, carbon tetrachloride and chloroform, are usually used.

The proportion of the oxide of nitrogen-containing compound to the comonomer used for the copolymerization is usually between about 2:1 and about 1:2 mol ratio.

The solid high molecular weight copolymers of the present invention are useful as sealants, adhesives and surface coatings, such as for metal and glass surfaces. The polymers of the present invention can be coated on various surfaces directly from the aqueous latex produced in the aqueous emulsion system or the separated and dried polymers can be dissolved in a fluorocarbon or chlorofluorocarbon solvent, such as the Freons, and then coated on the surface. In the case of using the aqueous latex for coating of a surface, the deposited copolymers after evaporation of the aqueous medium of the latex form a continuous homogeneous nonporous film on the surface with satisfactory adhesion thereto.

The solid high molecular weight copolymers of this invention may be preformed or fabricated at temperatures above about 150° C. into various articles, such as gaskets and O-rings, and the solid elastomers may be vulcanized to produce stiffer and harder articles.

The liquid and waxy copolymers of this invention are useful as lubricants, sealants, chemical intermediates, plasticizers and insulating and dielectric compositions.

The nitroso adducts of this invention are superior solvents and are particularly useful as solvents for the polymers of this invention.

The following examples are offered as a better understanding of the various aspects of this invention and should not be construed as limiting the invention.

*Example 1*

A 90 cm. x 20 mm. Pyrex glass tube wound with a heating wire was packed firmly with a 50–50 mixture of powdered anhydrous ferric chloride and 25–75 mesh powdered glass. (The function of powdered glass was to render the packing porous.) Each end of the tube was plugged with glass wool and with a rubber stopper provided with a 5 inch x 8 mm. glass outlet. This reactor tube was then inserted in a glass jacket. A thermometer was placed between the jacket and the reactor. Plastic tubing was attached to each end of the reactor, one end leading to the product receiver and the other leading to a T-tube where the gaseous reactants were premixed. The product receiver was a trap immersed in a Dry Ice-butyl Cellosolve bath.

The above tube was heated at 100° C. and flushed with dry nitrogen for fifteen minutes. The temperature then was lowered to 45° C. and 117 grams (one mol) of $CF_2=CFCl$ and nitric oxide in a ratio of approximately 2NO:1 $CF_2=CFCl$ by volume were passed through the tube during the course of 24 hours. The ratio and rate of throughput of reactants was roughly measured by means of the two heavy mineral oil bubblers which were mounted between the T-tube and the reactant containers. The ratio of the two gases was so adjusted that a very slight excess of olefin was used; that is $$2NO < CF_2=CFCl$$

The temperature of the tube was maintained at 45° C. throughout the reaction period. The product which was blue in color was collected in a trap immersed in a Dry Ice-butyl Cellosolve bath. During the course of the reaction a small quantity of a colorless gas that was not condensable at the Dry Ice bath temperature was continously escaping from the product receiver. As the gaseous reactants were fed into the ferric chloride tube the color of the packing started changing from brown-black to light brown. This color change traveled slowly along the packing and just before all the olefin was used in the reaction the entire length of the packing had changed its color. At this point the color of the outcoming product also started changing from deep blue to blue-green to green. The crude product (147 grams) was fractionated in a 3-foot low temperature distillation column which was previously flushed with nitrogen. During the first stages of fractionation a very slow stream of dry nitrogen was passed through the column in order to remove any dissolved nitric oxide and also to prevent entrance into the system of atmospheric oxygen. The fractionation products were the following:

(a) 9 grams of a fraction, B.P. −30° to +20°/630 mm. which was green in color and consisted of at least three compounds; namely, the starting olefin $$CF_2=CFCl$$

(50%), the acid fluoride $ClCF_2COF$, and the nitrite $ClCF_2CFClONO$. (See below.)

(b) 105 grams (76.1%)[1] of an intensely blue liquid, B.P. 31.7°/630 mm., 0°/119, $n_D°$ 1.3455, $d_4°$ 1.5422, M.W. 180. Molar refraction calculated for $$ClCF_2CFClNO$$

25.44, observed 24.96. Unequivocal proof for its structure and constitution was established by a comparison of its physical constants and its infrared spectrogram with those of the same compound prepared from $$ClCF_2CFClI$$

and nitric oxide in the presence of metallic mercury and ultraviolet light.

(c) 10 grams (7.25%) of a colorless liquid, B.P. 41–42°/630 mm., 7°/139 mm., $n_D^{25}$ 1.3557, $d_4^{25}$ 1.5629, M.W., 188. The infrared spectrogram of this compound was superimposable on that of $ClCF_2CFCl_2$ which is commercially available; all physical constants of this compound also are in agreement with those reported for $ClCF_2CFCl_2$.

[1] Unless otherwise stated percentages in yield reported henceforth are based on total weight of the mixture of products obtained minus the unreacted starting material.

(d) 3 grams (2.17%) of an intensely blue liquid, B.P. 9–13°/90 mm., 62°/630 mm., which was shown by vapor phase chromatography to be 98+% pure, $n_D^{25}$ 1.349, $d_4^{25}$ 1.5494, M.W. 186. Molar refraction calculated for $O_2NCF_2CFClNO$; 26.53; observed 26.18. Structure proof was based upon oxidation to $O_2NCF_2CFClNO_2$ and upon analysis of its nuclear magnetic resonance spectra which indicated the presence and location of both the —NO and —$NO_2$ groups.

(e) 10 grams (7.2%) of a colorless liquid, B.P. 70.5–71.5°/630 mm., $n_D^{25}$ 1.3669, $d_4^{25}$ 1.6199, M.W. 199. Molar refraction calculated for $O_2NCF_2CFCl_2$; 26.8; observed 27.5.

Analysis.—Calculated for $C_2Cl_2F_2NO_2$: C, 12.12; N, 7.07; Cl, 35.85; F, 28.8. Found: C, 12.44; N, 6.97; Cl, 35.67; F, 28.5.

The structure of this compound was assigned as $$O_2NCF_2CFCl_2$$

on the basis of nuclear magnetic resonance evidence and by the fact that its freezing point and infrared spectra differ from that of $ClCF_2CFClNO_2$ whose structure has been established unequivocally.

(f) 3 grams (2.17%) of a colorless liquid, B.P. 94.5°/630 mm., $n_D^{25}$ 1.375, $d_4^{25}$ 1.6704. Molar refraction calculated for $O_2NCF_2CFClNO_2$, 27.8; observed 28.3.

Analysis.—Calculated for $C_2ClF_3N_2O_4$: C, 11.48; N, 13.39; Cl, 16.98; F, 27.22. Found: C, 11.69; N, 13.07; Cl, 17.32; F, 27.42.

(g) 6 grams (4%) of a higher boiling material and non-distillable residue.

*Example II*

This experiment was carried out in the same way as in Example I. A freshly packed ferric chloride reactor tube was employed; the temperature of the reactor was maintained between 80° and 110° C. One mol, 117 grams of $CF_2=CFCl$ and approximately two mols of nitric oxide were passed through the reactor during a period of 24 hours. The ferric chloride packing in the tube again changed its color as the reaction proceeded. At the higher limit of temperature the light-brown iron complex which developed in the reactor as the gaseous mixture of the starting materials were passed through began to melt. Therefore, it was necessary to keep the temperature lower than 110° C. Under these conditions, the color change in the ferric chloride packing proceeded along the length of the tube at a faster rate than in the previous experiment. During the first 8 to 10 hours of the reaction, the outcoming product was condensing in the receiver to a deep blue liquid. Some gaseous material which was noncondensable at the Dry Ice temperature was escaping from the receiver. At about the end of the tenth hour the entire length of the reactor packing changed color from brown-black to light brown. At this point the blue color in the product started fading and developed to green; the evolution of the non-condensable gaseous material increased considerably.

The crude product weighed 140 grams and contained some suspended solid substance. The gaseous material in the product was vaporized into another trap, the remaining liquid was chilled and filtered from the suspended white solid, $N_2O_4$. The two parts were then combined and fractionated on a three-foot low temperature distillation column.

The following products were obtained:

(a) 10 grams $CF_2=CFCl$, B.P. −31°/630 mm.

(b) 10 grams (7.7%) $ClCF_2COF$, B.P. −22.5°/630 mm. This was identified by its infrared spectra and by conversion to $ClCF_2CO_2C_2H_2$.

(c) 12 grams (9.2%) of a blue-green liquid, B.P. 15–25°/630 mm. The blue shade in the color was due to $ClCF_2CFClNO$ which was a contaminant. Infrared spectra of this sample indicated that the compound could be the nitrite, $ClCF_2CFClONO$. The characteristic absorption bands for the —ONO group were present in the infrared spectrogram. For this compound these bands are at 5.5, 5.75 and 6.2$\mu$.

At this point the liquid in the distillation flask was chilled, washed with ice water (to remove $NO_2$) and dried over calcium chloride. Fractionation was then continued.

(d) 30 grams (23.2%) of $ClCF_2CFClNO$, B.P. 31.7°/630 mm.
(e) 21 grams (16.2%) of $ClCF_2CFCl_2$, B.P. 41–42°/630 mm.
(f) 6 grams (4.6%) of $O_2NCF_2CFClNO$, B.P. 10–12°/90 mm.
(g) 29 grams (22.2%) of $O_2NCF_2CFCl_2$, B.P. 70.5–71.5°/630 mm.
(h) 3 grams (2.1%) of $O_2NCF_2CFClNO_2$, B.P. 94.5°/630 mm.
(i) 19 grams (13.5%) of a higher boiling material, and nondistillable residue.

*Example III*

About 125 grams (1.12 mols) of $CF_2=CFCl$ and 66 grams (one mol) of NOCl were passed through a freshly packed ferric chloride reactor during a period of 24 hours at 45° C. The rate of throughput and ratio of the two gases were controlled by two heavy mineral oil bubblers. The ratio of the two reactants was so adjusted that the olefin was always in slight excess over nitrosyl chloride. The product was condensed in a Dry Ice cooled trap to a deep blue liquid and practically no gaseous material was escaped from the trap. At the spot where the gaseous mixture of the reactants came into contact with the packing a vigorous exothermic reaction ensued and the temperature at this spot was at about 100° C. This hot spot traveled along the length of the tube concurrently with a color change in the packing which turned from black-brown to light brown. At the end of the reaction the reactor was flushed with a slow stream of nitrogen in order to drive out the last traces of product from the packing. The crude product, which weighed 160 grams, was washed with water and dried with calcium chloride; fourteen grams of the product were absorbed by the water during washing. The wash water gave a test for both chloride and fluoride ions, and from it the acid $ClCF_2CO_2H$ was isolated in the form of its ester as follows:

The wash water was neutralized with dilute sodium hydroxide solution and evaporated to dryness on a steam bath and then in an oven at 100° C. for 8 hours. A white solid was obtained. This solid which consisted of NaCl, NaF, and $ClCF_2CO_2Na$ was suspended in absolute ethanol and the mixture was cooled to about −20° C. Concentrated sulfuric acid was then added slowly while stirring vigorously. The reaction mixture was brought to room temperature and then heated to 50° C. for 5 hours while stirring. Some ethyl ether was produced during this period. The flask was brought to room temperature and its contents shaken with 500 ml. ice cold water in a separatory funnel. The organic layer which settled was drawn off and dried over magnesium sulfate. Distillation gave $ClCF_2CO_2C_2H_5$, B.P. 91–93°/630 mm., $n_D^{25}$ 1.363, $d_4^{25}$ 1.2512.

Fractionation of the remaining 146 grams of product yielded the following fractions:

(a) 12 grams $CF_2=CFCl$, B.P. −31°/630 mm.
(b) 109.5 grams (82%) $ClCF_2CFClNO$, B.P. 31.7°/630 mm.
(c) 4.5 grams (3.3%) $ClCF_2CFCl_2$, B.P. 41–42°/630 mm.
(d) Traces of $O_2NCF_2CFClNO$, B.P. 62–63°/630 mm.
(e) 10 grams (7.46%) $O_2NCF_2CFCl_2$, B.P. 70.5–71.5°/630 mm.
(f) 1.2 grams (0.88%) $O_2NCF_2CFClNO_2$ B.P. 94.5°/630 mm.
(g) 4 grams (3%) higher boiling material, and non-distillable residue.

In order to identify the nature of the compounds which were absorbed by water during washing of the crude product, another similar experiment was carried out and the product was directly fractionated without washing. The above results were reproduced; a fraction B.P. −31 to +20°/630 mm. was collected first. This was a mixture of $CF_2=CFCl$, $ClCF_2COF$, with some $$ClCF_2CFClONO$$

and traces of $ClCF_2CFClNO$. The olefin and the acid fluoride were separated from this mixture and were characterized. The nitrite was not isolated in a pure state but its presence was indicated by infrared sepectra.

The nitrite therefore are useful intermediates to produce the acids or other compounds by hydrolysis. The acids are useful as surfactants in aqeuous systems.

*Example IV*

About 125 grams (1.12 mols) of $CF_2=CFCl$ and 66 grams (one mol) NOCl were passed through a freshly packed ferric chloride reactor as in Example I over a period of 24 hours, at about 90° C. The rate of throughput and ratio of the two gases were controlled by means of two heavy mineral oil bubblers. The product condensed in the Dry Ice cooled receiver was blue-green in color; an appreciable quantity of a gaseous material which was not condensable at the Dry Ice temperature escaped from the product receiver. At the end of the reaction the reactor tube was flushed with a slow stream of nitrogen in order to drive out the last traces of product from the packing. The crude product weighed 155 grams which upon fractionation on a 3-foot distillation column gave the following:

(a) 15 grams $CF_2=CFCl$, B.P. −31°/630 mm.
(b) 12 grams (8.55%) $ClCF_2COF$, B.P. −22.5°/630 mm.
(c) 5 grams (3.57%) of a fraction B.P. −5 to +25°/630 mm.

This was a mixture of $$ClCF_2CFClONO, ClCF_2CFClNO$$

and some NOCl.

(d) 37 grams (26.4%) $ClCF_2CFClNO$, B.P. 3.17°/630 mm.
(e) 36 grams (25.5%) $ClCF_2CFCl_2$, B.P. 41–42°/630 mm.
(f) Traces of $O_2NCF_2CFClNO$, B.P. 62–63°/630 mm. This compound undergoes decomposition when distilled at atmospheric pressure.
(g) 39.5 grams (27.2%) $O_2NCF_2CFCl$, B.P. 70.5–71.5°/630 mm.
(h) 2 grams (1.46%) $O_2NCF_2CFClNO_2$, B.P. 94.5°/630 mm.
(i) 7 grams (5.00%) higher boiling material, and non-distillable residue.

*Example V*

A freshly packed ferric chloride tube was employed. The reaction was carried out at 45° C. The ratio of reactants was adjusted so that a slight excess of NOCl was used. One hundred seventeen grams (one mol) of $CF_2=CFCl$ and about 75 grams (1.136 mols) of NOCl were reacted during a period of 23 hours. The products obtained upon fractionation of the reaction mixture were the same, with practically the same distribution, as the ones shown in Example IV.

*Example VI*

A ferric chloride reactor constructed in the manner described in Example I was heated at 100° C. and flushed with dry nitrogen for fifteen minutes. The temperature was then reduced to 45° C. One-hundred five grams (1.05 mols) of $CF_2=CF_2$ and nitric oxide in a ratio of approximately $2NO:1CF_2=CF_2$ by volume were passed through the tube during a period of 24 hours. The ratio and rate of throughput of reactants was roughly measured by means of two heavy mineral oil bubblers which were mounted between the T-tube and the reactant containers. The product which was collected in a Dry Ice cooled receiver condensed to a deep blue liquid. During the reaction a very small quantity of a noncondensable gas was escaping from the receiver. The color change described in the preceding experiments taking place as the reaction proceeded was observed in this reaction also.

At the end of the reaction the reactor was flushed with a slow stream of nitrogen in order to remove the last traces of product in the packing.

The product receiver was then attached to two Dry Ice cooled traps and then to an evacuated 22 liter flask all of which were in series. A vessel containing a dilute ferrous sulfate solution was placed between the last trap and the flask. The product receiver containing the crude product (140 grams) was removed from the Dry Ice-Cellosolve bath, was wrapped with clean glass wool and was allowed to warm up. The unreacted tetrafluoroethylene along with dissolved nitric oxide were passing through the system of traps, through the $FeSO_4$ solution, and then into the evacuated flask. During this process the unreacted nitric oxide was removed by the $FeSO_4$ solution and the unreacted $CF_2=CF_2$ (14 grams) was recovered. The gaseous products which condensed in the two Dry Ice cooled trap was combined with the liquid left in the receiver and fractionated on a 3 foot low temperature distillation column. The following fractions were obtained.

(a) 9 grams (8.04%) of a green liquid, B.P. −23 to 10°/630 mm.

This fraction consisted of two components; the acid fluoride $ClCF_2COF$, B.P. −22°/630 mm. which was later isolated from it, and the nitrite $ClCF_2CF_2ONO$, B.P. −16°/630 mm. which was present in very small quantities. Evidence for the presence of this nitrite was obtained from its infrared spectra and by chemical analysis.

(b) 79.9 grams (71.4%) $ClCF_2CF_2NO$, B.P. −7°/630 mm., M.W. 165.

The structure and constitution of this compound were established by oxidation to $ClCF_2CF_2NO_2$. The latter was synthesized by a different method. The physical constants, infrared spectra, and analytical results for $$ClCF_2CF_2NO_2$$

from the two methods were in perfect agreement.

(c) 12 grams (10.1%) $ClCF_2CF_2Cl$, B.P. −1 to 0°/630 mm., M.W. 169.5. This was identified by its infrared spectra.

(d) 6.5 grams (5.81%) $ClCF_2CF_2NO_2$, B.P. 30.8°/630 mm., $n_D^\circ$ 1.3236, $d_4^\circ$ 1.5622, M.W. 178. The structure of this compound was established by comparison of its physical constants and infrared spectra with those of $ClCF_2CF_2NO_2$ obtained by oxidation of $ClCF_2CF_2NO$.

(e) 3 grams (2.68%) $O_2NCF_2CF_2NO$, B.P. 19.5–20.5°/630 mm., $n_D^\circ$ 1.3354, $d_4^\circ$ 1.5357, M.W. 174.5. The structure of this compound was established by oxidation to $O_2NCF_2CF_2NO_2$.

(f) 3.5 grams (3.1%) $O_2NCF_2CF_2NO_2$, B.P. 52°/630 mm., $n_D^{25}$ 1.3501, $d_4^{25}$ 1.5962, M.W. 190.

Analysis.—Calculated for $C_2F_4N_2O_4$: C, 25.00; N, 14.59; F, 39.57. Found: C, 25.23; N, 14.27; F, 39.62.

(g) 1.5 grams (1.34%) of a colorless liquid, B.P. 76°/630 mm., M.W. 268.

Analysis.—Found: C, 18.11; N, 4.90; Cl, 13.12; F, 56.85. This compound was considered to be the oxazeditine

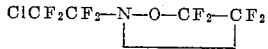

which has a molecular weight of 266 and the following analysis: C, 18.05; N, 5.26; Cl, 13.34; F, 57.14.

(h) 5.5 grams (4.9%) higher boiling material, and non-distillable residue.

Note.—The quantities and percentages of fractions (c) to (g) above are estimated values. These values were obtained from a separate fractionation of a mixture containing the above compounds (c) to (g). Fifty-eight grams of this mixture was accumulated in two experiments in which $CF_2=CF_2$ was reacted with nitric oxide. In each experiment distillation was discontinued when $ClCF_2CF_2NO$ was removed from the mixture of products. The remaining material was then stored at Dry Ice temperature until 58 grams of it was accumulated and then fractionated.

*Example VII*

In this reaction, the details of the preceding Example VI were followed. The reaction temperature was raised to 90° C. and a freshly packed ferric chloride reactor was employed.

One hundred five grams (1.05 mols) of $CF_2=CF_2$ was reacted with 2 mols nitric oxide over a period of 24 hours. A blue-green product (138 grams) was obtained which contained the following fractions.

(a) 20 grams $CF_2=CF_2$.

(b) 20 grams (17%) of a fraction, B.P. −23° to −10°/630 mm.

This was a mixture of $ClCF_2COF$, B.P. −22°/630 mm. and of $ClCF_2CF_2ONO$, B.P. −16°/630 mm. in a ratio of 4:1 respectively.

(c) 52.9 grams (44.8%) $ClCF_2CF_2NO$, B.P.−7°/630 mm.

(d) 12 grams (10.2%) $ClCF_2CF_2Cl$, B.P. −2 to 0°/630 mm.

At this point distillation was discontinued. The liquid in the distillation flask was chilled, washed with ice water, and dried over calcium chloride. Fractionation was then continued.

(e) 5.5 grams (4.66%) $O_2NCF_2CF_2NO$, B.P. 19.5–20.5°/630 mm.

(f) 10 grams (8.5%) $ClCF_2CF_2NO_2$, B.P. 30.8°/630 mm.

(g) 5 grams (4.22%) $O_2NCF_2CF_2NO_2$, B.P. 52°/630 mm.

(h) 8 grams (6.78%) higher boiling material, and non-distillable residue.

*Example VIII*

The details of the experimental procedure of Example I were followed in this reaction which was carried out at 45° C. A freshly packed ferric chloride reactor was used. The ratio of tetrafluoroethylene to nitric oxide was maintained at about $1CF_2=CF_2:2.5NO$ by volume. During the reaction unreacted nitric oxide was continuously escaping from the system through the open end of the product receiver. Tetrafluoroethylene and the low boiling products also must have been carried away by the escaping nitric oxide because the weight of crude product collected at the end of the reaction was much less than the theoretical quantity. The yield of $$ClCF_2CF_2NO$$

was low (45%) based on total weight of products; 30% based on the quantity of $CF_2=CF_2$ consumed. About the same distribution of products was obtained as in Example VII.

*Example IX*

The experimental setup and procedure described in Example I were followed in this reaction. In order to maintain a steady flow of $CF_2=CCl_2$ into the system the olefin container was maintained at about 25° C. by a water bath. The heavy mineral oil bubbler through which the olefin was introduced into the system was heated to about 50° C. by means of an electrical heating tape.

One hundred and forty grams (1.05 mols) of $CF_2=CCl_2$ and 2 mols of nitric oxide were passed through a freshly packed ferric chloride reactor of Example I during a period of 24 hours. The reactor temperature was maintained at 45° C. throughout the reaction period. At the end of the reaction the reactor was flushed with a slow stream of nitrogen in order to drive the last traces of product into the Dry Ice cooled product receiver.

The crude product (160 grams) was washed with water and dried over calcium chloride. Washing removed 22 grams from the product. The wash water gave a test for both chloride and fluoride ions and was strongly acidic. From this wash water, the acid $ClCF_2CO_2H$ was isolated in the form of its ethyl ester following the procedure outlined in Example III.

Distillation of the remaining 138 grams of the blue product gave the following fractions:

(a) 20 grams $CF_2=CCl_2$, B.P. 16°/630 mm.

(b) 50 grams of an intensely blue liquid, B.P. 14–16°/200 mm., 72.5°/630 mm. M.W. 195, $n_D^{25}$ 1.3942, $d_4^{25}$ 1.5859.

On the basis of the results of a similar reaction of $CF_2=CFCl$ with nitric oxide, the structure of this compound is assigned as $ClCF_2CCl_2NO$. When this compound is distilled at normal pressures (630 mm. Hg), it undergoes decomposition.

(c) 21 grams of colorless liquid, B.P. 84°/630 mm., M.P. 35.5° C. This compound reacted with zinc in ethanol and gave $CF_2=CCl_2$; its structure is $ClCF_2CCl_3$.

*Analysis.*—Calculated for $ClCF_2CCl_3$: C, 11.76; Cl, 69.51; F, 18.72. Found: C, 11.91; Cl, 69.47; F, 18.62.

(d) 19 grams of a colorless liquid, B.P. 74°/200 mm., 110°/630 mm., $n_D^{25}$ 1.4178, $d_4^{25}$ 1.6599.

*Analysis.*—Calculated for $C_2F_2Cl_3NO_2$: C, 11.16; N, 6.51; Cl, 49.77; F, 1767. Found: C, 10.88; N, 6.24; Cl, 50.86; F, 17.28. Empirical formula: $C_2F_2CL_3NO_2$.

(e) 15 grams higher boiling material, and nondistillable residue.

(f) 13 grams of a low boiling green liquid collected in a Dry Ice cooled trap which was connected to the reflux condenser of the distillation column. The evolution of the substance started as soon as the starting material $CF_2=CCl_2$ was removed from the system and the temperature of the distillation flask reached 80–85° at atmospheric pressure (630 mm. Hg). This green material reacted vigorously with water and most of it was absorbed upon washing, leaving behind some $ClCF_2CCl_2NO$.

Distillation of a portion of this green liquid gave the following:

(a) A red-yellow liquid, B.P. −12 to −10°/630 mm., M.W. 64. This was identified by its infrared spectra to be nitrosyl chloride.

(b) A yellow-brown liquid, B.P. −5 to 0°/630 mm., M.W. 79. This compound is suspected to be nitryl chloride ($NO_2Cl$).

(c) A colorless liquid, B.P. 16°/630 mm. which was shown to be $CF_2=CCl_2$.

(d) A blue liquid ($ClCF_2CCl_2NO$) left in the distillation flask which started decomposing when the flask temperature reached 75–80° C.

*Example X*

One hundred and forty grams (1.05 mols) $CF_2=CCl_2$ and 66 grams (one mol) of NOCl were passed through a ferric chloride tube (90 cm. x 20 mm.) at 45° C. over a period of 24 hours. The details of the preceding Example IX were followed in this reaction. The crude blue product (162 grams) which was collected in a Dry Ice cooled trap was washed with water and dried over calcium chloride. Fifteen grams of the product dissolved in the wash water during this operation. Distillation yielded the following products:

(a) 14 grams $CF_2=CCl_2$, B.P. 16°/630 mm.

(b) 55 grams $ClCF_2CCl_2NO$, B.P. 14–16°/200 mm.

(c) 25 grams $ClCF_2CCl_3$, B.P. 84°/630 mm., M.P. 34–35.5.

(d) 27 grams $C_2F_2Cl_3NO_2$, B.P. 74°/200 mm.

(e) 11 grams higher boiling material, and non-distillable residue.

(f) 13 grams of a low boiling green liquid collected in a Dry Ice cooled trap, which was attached to the distillation column. This liquid had the same characteristics as those of fraction (f) in Example IX.

*Example XI*

Hexafluoropropene, 50 grams (0.333 mol) and nitrosyl chloride, 22 grams (0.33 mol), were placed in an evacuated 22 liter flask. The flask was exposed to sunlight for 8 hours during which period a blue-green liquid condensed at the bottom and a solid thin white film was deposited on the walls of the flask. At the end of this period, the contents of the flask were slowly pumped into a liquid air trap in which it solidified. After about five hours the white solid ($N_2O_4$) started subliming and filled the evacuated flask with a brown gas which was nitrogen dioxide.

The product collected in the trap was washed with water and dried with calcium chloride. Distillation gave the following fractions:

(a) 25 grams $CF_3CF=CF_2$, B.P. −31°/630 mm.

(b) 12 grams of a blue liquid, B.P. 20.5°/630 mm., $n_D^\circ$ 1.3003, $d_4^\circ$ 1.5729, M.W. 212. No consistent analytical results could be obtained for this compound. Its empirical formula is $C_3F_6ClNO$; this was established by conversion to $C_3F_6ClNO_2$ for which a good analysis was obtained. On the basis of the results of previous experiments, its structure is assigned as $CF_3CF(NO)CF_2Cl$.

(c) 5 grams of a colorless liquid, B.P. 30°/630 mm., $n_D^\circ$ 1.3110, $d_4^\circ$ 1.5977, N.W. 219. This compound was shown by its infrared spectra to be $CF_3CFClCF_2Cl$.

(d) 14 grams of a colorless liquid, B.P. 51.5–52°/630 mm., $n_D^{25}$ 1.3145, $d_4^{25}$ 1.6313, M.W. 236—

$$CF_3CFClCF_2NO_2$$

*Analysis.*—Calculated for $C_3F_6ClNO_2$: C, 15.52; N, 6.03; Cl, 15.3; F, 49.14. Found: C, 15.81; N, 5.82; Cl, 15.11; F, 48.87.

The nitro compounds of this invention are good polar solvents and are useful as solvents and swelling agents or plasticizers for highly fluorinated polymers. The nitroso compounds are useful as monomers to produce polymers as hereinbefore described. The nitrite compounds are useful as intermediates to produce the acids, which are surfactants.

Various modifications of the described procedure as well as changes in ratios of reactants and other reaction conditions will become apparent to those skilled in the art without departing from the scope of this invention.

We claim:

1. A process which comprises reacting a nitrosyl halide with an excess of a halogen-containing olefin in which the doubly bonded carbon atoms are substituted only with halogens in the presence of a heavy metal halide in which the heavy metal is a variable valence metal having an atomic number of at least 26 to produce the corresponding nitroso-olefin adduct and recovering the nitroso-olefin adduct thus produced from the reaction mixture as a major product of the process.

2. The process of claim 1 in which the temperature of reaction is maintained between about 20 and about 150° C.

3. The process of claim 1 in which the olefin has at least one fluorine attached to at least one of the doubly bonded carbon atoms.

4. The process of claim 1 in which the nitrosyl halide is nitrosyl chloride.

5. A process which comprises reacting nitric oxide and a halogen-containing olefin in which the doubly bonded carbon atoms are substituted only with halogens in the presence of a heavy metal halide in which the heavy metal is a variable valence metal having an atomic number of at least 26 to produce the adduct of nitrosyl halide and said olefin.

6. The process of claim 5 in which said heavy metal halide is ferric chloride.

7. The process of claim 5 in which said heavy metal halide is cuprous chloride.

8. The process of claim 5 in which said heavy metal halide is cobaltous chloride.

9. The process of claim 1 which comprises reacting nitrosyl chloride with tetrafluoroethylene.

10. The process of claim 1 which comprises reacting nitrosyl chloride with trifluorochloroethylene.

11. The process of claim 1 which comprises reacting nitrosyl chloride with difluorodichloroethylene.

12. The compound, $O_2NCF_2CFClNO$.

13. A perfluorohaloalkyl nitrite.

14. The compound, $ClCF_2CFClONO$.

15. The compound, $ClCF_2CF_2ONO$.

16. A perhalogenated aliphatic 2-nitroso hydrocarbon.

17. The compound, $CF_3CF(NO)CF_2Cl$.

18. The compound,

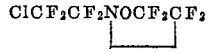

References Cited in the file of this patent

UNITED STATES PATENTS

| | | |
|---|---|---|
| 2,474,901 | Martin | July 5, 1949 |

FOREIGN PATENTS

| | | |
|---|---|---|
| 770,618 | Great Britain | Mar. 20, 1957 |
| 770,619 | Great Britain | Mar. 20, 1957 |
| 562,549 | Canada | Sept. 2, 1958 |

OTHER REFERENCES

Titov: C.A., vol. 31 (1937), page 57732.

UNITED STATES PATENT OFFICE
CERTIFICATE OF CORRECTION

Patent No. 3,072,705                                      January 8, 1963

Joseph D. Park et al.

It is hereby certified that error appears in the above numbered patent requiring correction and that the said Letters Patent should read as corrected below.

Column 1, line 57, for "bromide" read -- bromine --; column 3, line 7, for "one", first occurrence, read -- on --; column 11, line 34, for "1767" read -- 17.67 --.

Signed and sealed this 12th day of November 1963.

(SEAL)
Attest:
ERNEST W. SWIDER                                            EDWIN L. REYNOLDS Attesting Officer                                        Acting Commissioner of Patents